(12) United States Patent
Keller

(10) Patent No.: US 6,491,236 B1
(45) Date of Patent: Dec. 10, 2002

(54) METHOD AND DEVICE FOR INJECTING A FUEL/LIQUID MIXTURE INTO THE COMBUSTION CHAMBER OF A BURNER

(75) Inventor: Jakob Keller, Wohlen (CH)

(73) Assignee: Alstom, Paris (FR)

( * ) Notice: Subject to any disclaimer, the term of this patent is extended or adjusted under 35 U.S.C. 154(b) by 0 days.

(21) Appl. No.: 09/208,441

(22) Filed: Dec. 10, 1998

(30) Foreign Application Priority Data

Dec. 17, 1997 (EP) ............................................. 97810994

(51) Int. Cl.[7] ................................................ F23D 11/16
(52) U.S. Cl. ........................ 239/399; 239/405; 239/434
(58) Field of Search .......................... 431/4, 8, 9, 158, 431/354, 350; 239/403, 405, 406, 423, 427.5, 400, 404, 428, 468, 399, 434; 60/740

(56) References Cited

U.S. PATENT DOCUMENTS

| | | | | |
|---|---|---|---|---|
| 1,369,688 A | * | 2/1921 | Mayer | 239/405 |
| 1,381,095 A | * | 6/1921 | Starr | 239/400 |
| 1,413,134 A | * | 4/1922 | Purnell | 239/405 |
| 1,474,900 A | * | 11/1923 | Goldsmith | 239/405 |
| 1,564,064 A | * | 12/1925 | Hannah | 239/405 |
| 2,566,040 A | * | 8/1951 | Simmons | 239/403 |
| 2,879,948 A | * | 3/1959 | Seibel | 239/427.5 |
| 3,092,332 A | * | 6/1963 | Bickel et al. | 239/405 |
| 3,152,065 A | * | 10/1964 | Sharp et al. | 239/405 |
| 3,814,567 A | * | 6/1974 | Zink et al. | 431/4 |
| 3,993,431 A | | 11/1976 | Oda et al. | 431/190 |
| 4,255,121 A | | 3/1981 | Sugimoto | 431/208 |
| 4,416,610 A | * | 11/1983 | Gallagher, Jr. | 431/4 |
| 4,819,878 A | * | 4/1989 | Bailey et al. | 239/427 |
| 5,129,583 A | * | 7/1992 | Bailey et al. | 239/427 |
| 5,176,324 A | * | 1/1993 | Furuse et al. | 431/8 |
| 5,220,786 A | | 6/1993 | Campbell | 60/740 |
| 5,249,957 A | * | 10/1993 | Hirata | 431/354 |
| 5,484,107 A | * | 1/1996 | Holmes | 239/427.5 |
| 5,681,162 A | * | 10/1997 | Nabors, Jr. et al. | 431/8 |
| 5,685,705 A | * | 11/1997 | Knöpfel | 431/8 |
| 5,685,706 A | * | 11/1997 | Hersh et al. | 431/8 |
| 5,791,892 A | * | 8/1998 | Döbbeling et al. | 431/354 |
| 5,813,847 A | * | 9/1998 | Eroglu et al. | 431/8 |
| 6,132,202 A | * | 10/2000 | Eroglu et al. | 431/350 |

FOREIGN PATENT DOCUMENTS

| | | | | |
|---|---|---|---|---|
| DE | 257016 | * | 2/1913 | 239/405 |
| EP | 0314112 A1 | | 5/1989 | |
| EP | 0455459 A2 | | 11/1991 | |
| FR | 458606 | * | 10/1913 | 239/405 |
| FR | 2139636 | | 1/1973 | |
| GB | 2306002 A | * | 4/1997 | |
| JP | 148012 | * | 6/1988 | 431/4 |
| RU | 1416199 | * | 8/1988 | 239/405 |

* cited by examiner

*Primary Examiner*—Sara Clarke
(74) *Attorney, Agent, or Firm*—Burns, Doane, Swecker & Mathis, L.L.P.

(57) ABSTRACT

A method and a device are described for injecting a fuel/liquid mixture into the combustion chamber of a burner, with an atomizer nozzle and with at least one liquid delivery region, at least one fuel delivery region separated from the latter and at least one volume region which is provided upstream of the atomizer nozzle orifice and in which the liquid is mixed with the fuel.

The invention is distinguished in that the liquid experiences the generation of vortices before or during intermixing with the fuel.

3 Claims, 3 Drawing Sheets

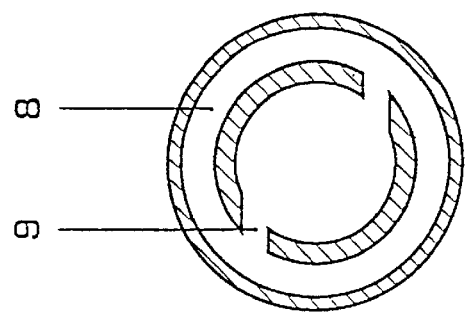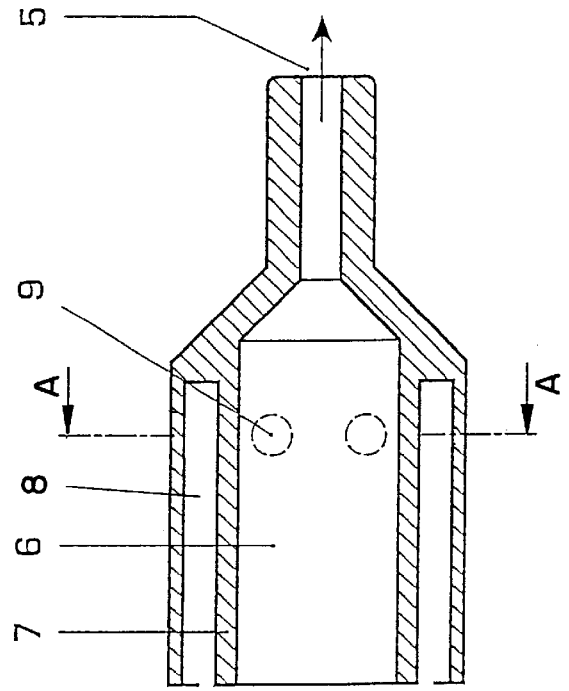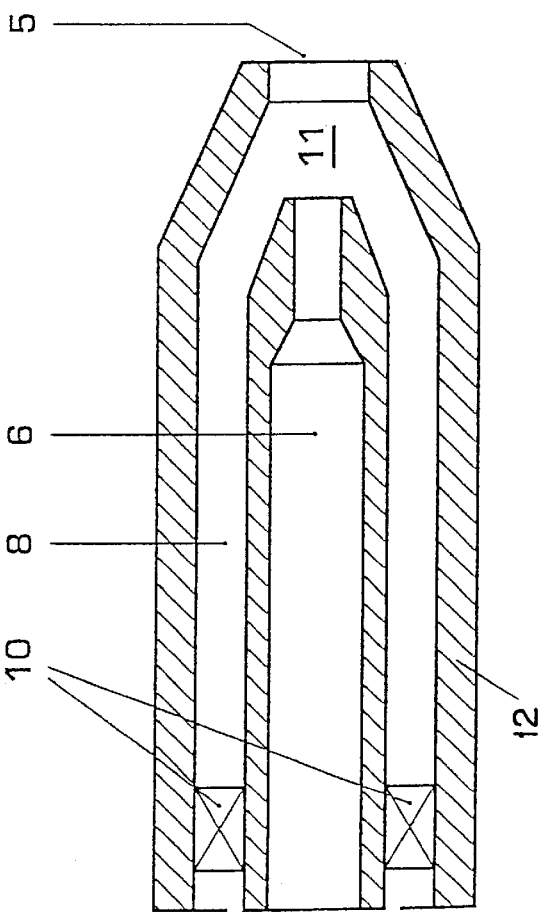

METHOD AND DEVICE FOR INJECTING A FUEL/LIQUID MIXTURE INTO THE COMBUSTION CHAMBER OF A BURNER

FIELD OF THE INVENTION

The invention relates to a method and a device for injecting a fuel/liquid mixture into the combustion chamber of a burner.

BACKGROUND OF THE INVENTION

In the firing of combustion chambers which are used for energy generation and, particularly in combination with following gas turbine plants, make it possible to convert fossil fuels into electric energy, there is the constant endeavour to optimize the combustion operation in terms of the complete combustion of the fuels used and the reduction of emissions occurring due to combustion.

Thus, for example, incomplete combustion of the fuels introduced into the combustion chamber leads to increased NOx emission values which can be decisively reduced by admixing the fuel with water.

During the operation of gas turbine plants, the burner of which is operated with a fuel/water mixture in order to avoid increased NOx emission values, it becomes apparent that intensive low-frequency vibrations are established within the burner unit, the amplitude of these vibrations rising with an increasing water fraction in the fuel/water mixture. A plurality of discrete resonant vibrations with different frequencies are formed, depending on the size and shape of the burner unit.

Such pronounced vibration phenomena at low frequencies seem, with a great degree of certainty, to be caused by diffraction effects of entropy waves at the turbine inlet which follows the combustion chamber in the direction of flow. Entropy waves occur primarily when the temperature ratio over the entire flame within the combustion chamber is markedly higher than 2. For this reason, vibrations of this kind are often established between the ignition event and the idling mode of the burner, especially since the air flowing into the combustion chamber has a relatively low temperature, as compared with the flame temperature, so that the temperature ratio over the entire flame is very high.

In order to suppress the low-frequency vibrations which are formed, relevant modifications could be made to the combustion chamber and its connection to the turbine inlet orifice, these modifications making it possible to vary, and appropriately modulate, the resonant behaviour of this volume region. For example, it is appropriate, for this purpose, to provide suitable bypass lines in the combustion chamber region or else in the high pressure turbine region, these bypass lines making it possible to achieve controlled vibration damping. However, modifications of this kind would necessitate expensive reconstruction measures on existing gas turbine plants, but such measures are unattractive due to the associated high cost outlay and a long-term operational shutdown of the plant.

SUMMARY OF THE INVENTION

The objection which the invention is based is to develop a method and a device for injecting a fuel/liquid mixture into the combustion chamber of a burner with an atomizer nozzle, in such a way that the occurrence of intensive low-frequency vibrations within the combustion chamber can be largely eliminated, without the need for cost-intensive reconstruction measures on existing plant components, in particular in completed gas turbine plants.

The invention is based on the knowledge that the resonant behaviour of low-frequency vibrations caused within the combustion chamber by the formation of entropy waves is determined essentially by a duration $\kappa$ which corresponds to the time interval between the outflow of the fuel/liquid mixture from the atomizer nozzle and the ignition event within the combustion chamber.

Investigations on a burner model setup, which provides, upstream of entry into the combustion chamber, an atomizer nozzle suitable for supplying a fuel/liquid mixture and the resonant behaviour of which was measured with the aid of a loudspeaker system setting the burner in vibration, showed that, depending on the acoustic framework conditions which result, in particular, from the geometry of the burner shape and burner volume, definite resonant frequencies are formed, one of which corresponded approximately to the Helmholtz resonant frequency of the acoustic system. Measurements of the sound energy absorbed by the burner system and provided by the loudspeaker system indicated, in the case of a resonant vibration behaviour, the burner system absorbs the introduced sound energy to the greatest extent, if $\kappa$ assumes very low values, near zero, or values near the reciprocal value of the corresponding resonant frequency. In other words, it is possible, by an appropriate choice of the duration $\kappa$, to excite the modes of the entropy waves particularly sharply. Conversely, this also means that, by a suitable choice of the parameter $\kappa$, a variable was found, by the suitable choice of which operating states of a burner can be set, in which the excitation of entropy waves causing the formation of the low-frequency vibrations can be largely suppressed. The parameter $\kappa$, which indicates the duration between the injection of the fuel/water mixture and the combustion event, thus plays a decisive role in suppressing the low-frequency vibrations.

Further investigations showed that the duration $\kappa$ rises with an increasing liquid fraction which is admixed with the fuel. However, so that, despite the existing dependence on the quantity of the liquid admixed with the fuel, the duration $\kappa$ can be set at suitable values at which the vibrational excitation of the entire burner system can, if possible, be suppressed, it was recognized, according to the invention, that the duration $\kappa$ can be reduced by means of controlled swirling of the liquid, water in the above case, to be admixed with the fuel, so that, by the controlled introduction of vortices into the incoming liquid stream before or during intermixing with the fuel, the duration $\kappa$ can be set essentially as desired and independently of the liquid fraction within the fuel/liquid mixture.

According to the invention, a method for injecting a fuel/liquid mixture into the combustion chamber of a burner, with an atomizer nozzle and with at least one liquid delivery region, at least one fuel delivery region separated from the latter and at least one volume region which is provided upstream of the atomizer nozzle orifice and in which the liquid is mixed with the fuel, is designed in such a way that the liquid undergoes swirling before or during intermixing with the fuel.

Since, as mentioned above, the duration $\kappa$ increases with an increasing liquid fraction in the fuel/liquid mixture, it is possible to compensate the increase of $\kappa$ by the increased formation of vortices in the incoming liquid stream. By the appropriate introduction of vortices into the incoming liquid stream or into the liquid flow to be intermixed with the fuel, the ignition time or the duration $\kappa$ can be set individually in dependence on the liquid fraction to be admixed, so that the formation of entropy waves can, if possible, be prevented.

A device according to the invention for injecting a fuel/liquid mixture into the combustion chamber of a burner, with an atomizer nozzle, for carrying out the abovementioned method according to the invention is designed in that a vortex-generating element is provided in at least one liquid delivery region or the liquid delivery region is arranged in such a way that the liquid flow is swirled before or during intermixing with the fuel.

The degree of swirling can be set by means of appropriate design measures within the liquid delivery region, for example by the inclination of deflecting plates relative to the direction of flow of the liquid or by appropriately made passage orifices between the liquid delivery region and the fuel delivery region.

Atomizer nozzles known per se have a delivery region axially relative to the nozzle outlet orifice for the fuel to be atomized. After the fuel, preferably fuel oil, has passed out through the nozzle orifice, said fuel is atomized into very fine fuel droplets. In the device according to the invention, before the fuel flows out of the nozzle outlet orifice, liquid, preferably water, is admixed with the fuel, said water being intermixed in swirled form with the fuel before the latter flows out of the nozzle outlet orifice.

For this purpose, it is particularly suitable to have passage orifices between the liquid delivery region and the fuel delivery region, the liquid being introduced through said orifices perpendicularly to the flow of the fuel. In this way, the liquid entering the fuel flow assumes an approximately spirally spreading vortex, by means of which the liquid is intermixed with the fuel.

In an alternative nozzle arrangement, a coaxial liquid flow is provided, separated by an intermediate wall, around the fuel flow directed axially relative to the nozzle outlet orifice, said liquid flow being changed by means of vortex-generating elements within the liquid delivery region into a vortex rotating coaxially around the fuel delivery region. Just upstream of the atomizer nozzle outlet orifice, the two flows collide and pass in swirled form to the nozzle outlet orifice.

The vortex intensity within the liquid flow can be appropriately determined, depending on the fraction of liquid to be admixed with the fuel.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings wherein:

FIG. 2 shows an atomizer nozzle with passage orifices,
FIG. 2a shows a cross-sectional view of FIG. 2 along A—A,
FIG. 3 shows an atomizer nozzle with vortex-generating elements within the liquid delivery region, and
FIGS. 4a, b show a cross-sectional illustration through an atomizer nozzle with perpendicular fuel and liquid delivery regions in relation to the nozzle outlet orifice.

DESCRIPTION OF THE PREFERRED EMBODIMENT

Figure 1A:
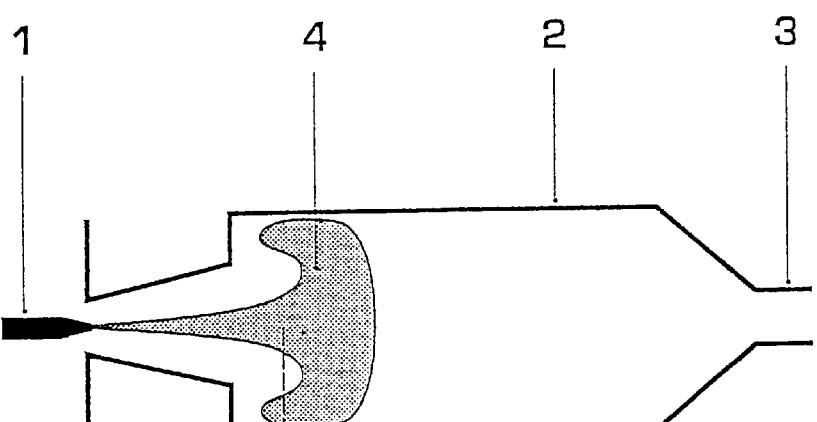
FIGS. 1a, 1b, and 1c show a diagrammatic burner illustration for three different case configurations:
  a: atomization of pure fuel,
  b: atomization of a fuel/liquid mixture with a low liquid fraction, and
  c: atomization of a fuel/liquid mixture with a high liquid fraction.
Figure 1B:
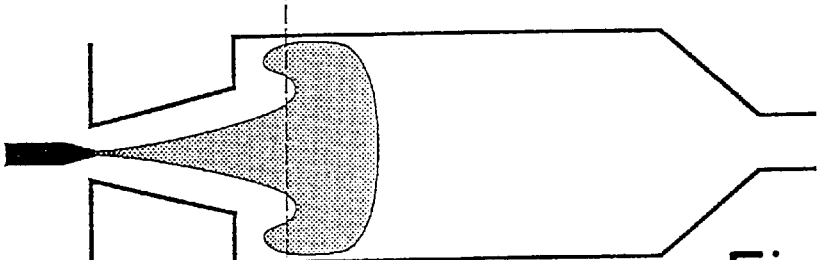
Figure 1C:
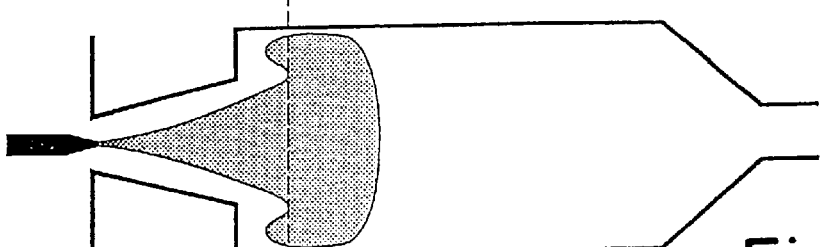

Referring now to the drawings, wherein like reference numerals designate identical or corresponding parts throughout the several views, FIGS. 1a to c illustrate a diagrammatic cross section through a burner system, which consists in each case of an atomizer nozzle 1, a combustion chamber 2 and a connecting region 3 for a gas turbine, not illustrated, which follows the combustion chamber 2. FIG. 1a illustrates that fuel only is atomized from the atomizer nozzle 1, said fuel being ignited at a definite time interval $\kappa$ and forming the stylized combustion flame 4 within the combustion chamber 2.

FIG. 1b illustrates the case where a low liquid fraction is admixed with the fuel even before the latter flows out of the atomizer nozzle 1. Without the measure according to the invention, specifically admixing the liquid stream in swirled form with the fuel, the time interval $\kappa$ between the atomizer nozzle and the combustion flame would become greater, as described initially, but the timespan $\kappa$ can be maintained by the appropriate introduction of vortices within the liquid to be admixed with the fuel, as in the case according to FIG. 1a.

In order to keep $\kappa$ constant even in the case of larger quantities of liquid which are admixed with the fuel within the atomizer nozzle 1, the liquid to be admixed with the fuel must be swirled to a greater extent. By means of these measures, the vibration behaviour of the burner can be maintained, in spite of liquid being admixed with the fuel, as in the case of pure fuel combustion according to FIG. 1a, in that, depending on the liquid fraction, the liquid to be admixed with the fuel is swirled in a correspondingly pronounced manner.

FIG. 2 illustrates an advantageous embodiment of an atomizer nozzle in longitudinal section (illustration on the left). The fuel delivery region 6 is provided axially relative to the nozzle outlet orifice 5. Optionally, liquid in the form of water can be admixed with the fuel within the fuel delivery region 6. A water delivery region 8, separated by an intermediate wall 7, is provided and is arranged coaxially around the fuel delivery region 6 between the intermediate wall 7 and an outer annular wall 12. As may be inferred from the cross-sectional illustration FIG. 2a, two mutually opposite passage orifices 9 are made in the intermediate wall 7, said orifices passing through the intermediate wall 7 in such a way that the liquid flows in essentially tangentially to the inner wall of the fuel delivery region 6. Liquid vortices are thereby formed within the fuel in the fuel delivery region 6 and subsequently emerge from the nozzle outlet orifice 5 as a fuel/liquid mixture.

In the exemplary embodiment according to FIG. 2, the vortex generation or swirl effect of the liquid entering the fuel is generated by means of the shape and arrangement of the passage orifices 9 within the intermediate wall 7. These are two bores, the bore axes of which run essentially parallel. It is important, in this case, that the fuel entering the fuel delivery region through the bores initially comes to bear, in the same direction of flow, on the inner wall of the delivery region perpendicularly to the direction of flow of the fuel.

FIG. 3 illustrates a further possibility for the intermixing of fuel and liquid, with vortices being generated, in which the fuel delivery region running axially relative to the nozzle outlet orifice 5 is surrounded by a coaxial liquid delivery region 8. Provided in the liquid delivery region 8 is a vortex-generating element 10 which sets the liquid flow in rotational movement around the centrally arranged fuel delivery region. Just upstream of the nozzle outlet orifice 5 a mixing volume 11 is provided, in which the liquid and the fuel are intermixed.

Figure 4A:
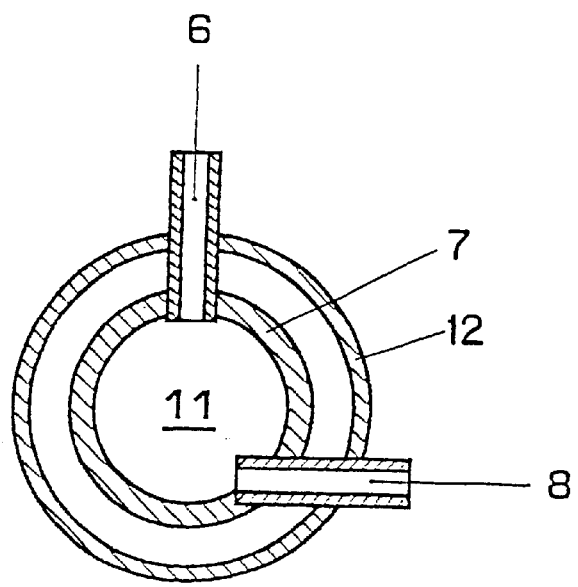
Figure 4B:
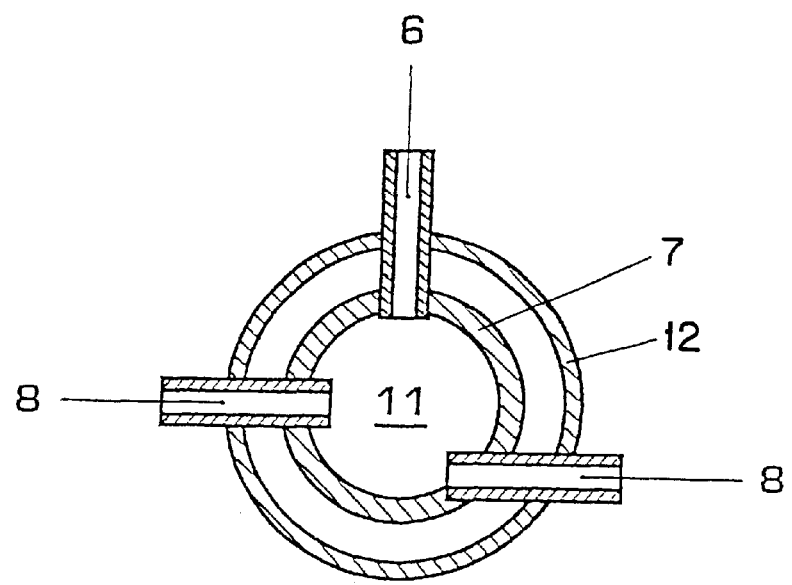

FIGS. 4a and 4b show alternative cross-sectional illustrations through an atomizer nozzle 1.

In FIG. 4a, fuel enters a mixing volume 11 vertically via a delivery duct 6. A delivery duct 8, via which liquid enters the mixing volume 11, is, in this case, arranged in such a way that the liquid, when it enters the mixing volume, is directed tangentially to the inner wall 7 of the mixing volume. The liquid coming to bear on the inner wall 7 of the mixing volume 11 thereby experiences, due to the circular contour of the inner wall 7, the generation of vortices, by means of which it is intermixed with the fuel.

A plurality of liquid delivery ducts may be provided in the mixing volume 11, depending on the liquid fraction. In FIG. 4b, two liquid delivery ducts and one fuel delivery duct are provided. It is possible to set the degree of swirling within the mixing volume 11 by an appropriate setting of the inflow velocities at which the liquid flows into the mixing volume 11 according to FIG. 4b.

Obviously, numerous modifications and variations of the present invention are possible in light of the above teachings. It is therefore to be understood that, within the scope of the appended claims, the invention may be practised otherwise than as specifically described herein.

What is claimed as new and desired to be secured by Letters Patent of the United States is:

1. An atomizer nozzle device for injecting a fuel/water mixture into a combustion chamber of a burner, comprising:

at least one water delivery part and at least one fuel delivery part separated from the at least one water delivery part, and with at least one volume upstream of an atomizer nozzle orifice in which water can be mixed with fuel; and wherein the fuel delivery part is provided axially relative to the atomizer nozzle orifice, said fuel delivery part being surrounded coaxially by the water delivery part, and wherein there is provided between the two delivery parts an intermediate wall which has orifices through which the water in liquid state is introduced in the fuel delivery part perpendicularly to a flow of the fuel and enters the fuel delivery part swirled, and where the water is intermixed with the fuel before the fuel/water mixture flows out through the atomizer nozzle orifice; and wherein the orifices are positioned in the intermediate wall in such a way that a contour of orifices induce a water flow rotating around an axis of the atomizer nozzle orifice in the fuel delivery part.

2. The device as claimed in claim 1, wherein two orifices are positioned opposite one another in the intermediate wall and have orifice walls running parallel to one another.

3. An atomizer nozzle device for injecting a fuel/water mixture into a combustion chamber of a burner, comprising:

an atomizer nozzle orifice having a central axis for discharging the fuel/water mixture in a fluid flow direction;

a mixing chamber disposed upstream from the atomizer nozzle orifice;

first passage means for supplying fuel to the mixing chamber, said first passage means being disposed along the central axis of said atomizer nozzle orifice;

second passage means for supplying water in liquid state to the mixing chamber, said second passage means surrounding said first passage means coaxially, said second passage means including at least one orifice through which water is introduced in the fuel delivery part perpendicularly to a flow of the fuel, where the water is intermixed with the fuel before the water flows out through the atomizer nozzle orifice; and wherein said at least one orifice of said second passage means is positioned in such a way that a contour of the at least one orifice of the second passage means induces a water flow rotating around an axis of the atomizer nozzle orifice in the first passage means.

* * * * *